United States Patent
Pushpoth et al.

(10) Patent No.: US 10,417,797 B2
(45) Date of Patent: Sep. 17, 2019

(54) GRAPHICALLY DISPLAYING DATA HAVING COMPLEX RELATIONSHIPS

(71) Applicant: MetricStream, Inc., Palo Alto, CA (US)

(72) Inventors: Vaishakh Pushpoth, Bangalore (IN); John Leung, San Jose, CA (US); Debarati Goswami, Mountain View, CA (US); Vasant Balasubramanian, Santa Clara, CA (US)

(73) Assignee: METRICSTREAM, INC., Palo Alto, CA (US)

( * ) Notice: Subject to any disclaimer, the term of this patent is extended or adjusted under 35 U.S.C. 154(b) by 192 days.

(21) Appl. No.: 15/429,533

(22) Filed: Feb. 10, 2017

(65) Prior Publication Data

US 2018/0182137 A1    Jun. 28, 2018

(30) Foreign Application Priority Data

Dec. 22, 2016   (IN) .............................. 201631043907

(51) Int. Cl.
  *G06T 11/20*    (2006.01)
  *G06F 3/0482*   (2013.01)
  *G06F 3/0481*   (2013.01)

(52) U.S. Cl.
  CPC .......... *G06T 11/206* (2013.01); *G06F 3/0482* (2013.01); *G06F 3/04817* (2013.01)

(58) Field of Classification Search
  CPC . G06T 11/206; G06T 2200/24; G06F 3/0482; G06F 3/04817

(Continued)

(56) References Cited

U.S. PATENT DOCUMENTS 6,104,400 A * 8/2000 Halachmi ............. G06F 3/0481
  715/784
6,219,053 B1 * 4/2001 Tachibana ............. G06F 3/0481
  345/440

(Continued)

OTHER PUBLICATIONS

Mistry et al., "Puzzhull: Cavity and Protrusion Hierarcy to Fit Conformal Polygons", In: Computer-Aided Design. Dated Nov. 2013, 7 pages.

(Continued)

*Primary Examiner* — Kieu D Vu
*Assistant Examiner* — Blaine T. Basom
(74) *Attorney, Agent, or Firm* — Hickman Palermo Becker Bingham LLP

(57) ABSTRACT

A method for generating a visual illustration of data organized in a multiway graph is provided. In an embodiment, a computer system maintains a plurality of nodes and edges within a multiway graph and displays a visual user interface with a first node positioned at the center of the visual user interface and child nodes positioned at radially symmetric positions surrounding the first node. The computer system receives a first input that specifies a selection of a first child node. In response to receiving the first input, the computer system updates the visual user interface to display: the first node, positioned at the center; the child nodes, positioned at radially symmetric positions surrounding the first node; the first child node positioned below the first node; and grandchild nodes of the first child node, displayed as polygons positioned at radially symmetric positions around a circular area surrounding the child nodes.

18 Claims, 9 Drawing Sheets

(58) Field of Classification Search
USPC .................................................. 715/853, 854
See application file for complete search history.

(56) References Cited

U.S. PATENT DOCUMENTS

| | | | | |
|---|---|---|---|---|
| 8,028,250 | B2* | 9/2011 | Vronay | G06F 3/0482 |
| | | | | 715/853 |
| 9,223,461 | B1* | 12/2015 | Brown | G06F 3/0485 |
| 9,256,350 | B2* | 2/2016 | Pic | H04L 41/22 |
| 2002/0113816 | A1 | 8/2002 | Mitchell et al. | |
| 2003/0210284 | A1* | 11/2003 | Vandruff | G06F 17/30994 |
| | | | | 715/853 |
| 2003/0214517 | A1 | 11/2003 | Gossweiler et al. | |
| 2003/0218641 | A1* | 11/2003 | Longobardi | G06F 17/30067 |
| | | | | 715/853 |
| 2004/0133853 | A1* | 7/2004 | Poerner | G06F 8/38 |
| | | | | 715/205 |
| 2011/0138340 | A1* | 6/2011 | Holm-Petersen | G06Q 10/06 |
| | | | | 715/854 |
| 2014/0047361 | A1* | 2/2014 | Gaspar | G06F 3/048 |
| | | | | 715/762 |
| 2014/0267241 | A1 | 9/2014 | Keondjian et al. | |
| 2015/0074612 | A1* | 3/2015 | Antipa | G06F 3/0482 |
| | | | | 715/854 |
| 2015/0066933 | A1 | 5/2015 | Kolodziej et al. | |
| 2015/0135052 | A1 | 5/2015 | Thompson et al. | |
| 2015/0143302 | A1* | 5/2015 | Chang | G06F 3/04815 |
| | | | | 715/849 |
| 2016/0321378 | A1 | 11/2016 | Kagan et al. | |
| 2018/0101894 | A1* | 4/2018 | Markoff | G06Q 30/0641 |

OTHER PUBLICATIONS

International Searching Authority, "Search Report" in application No. PCT/US2017/066837, dated Feb. 22, 2018, 20 pages.

Current Claims in application No. PCT/US2017/066837, dated Feb. 2018, 7 pages.

* cited by examiner

US 10,417,797 B2

GRAPHICALLY DISPLAYING DATA HAVING COMPLEX RELATIONSHIPS

BENEFIT CLAIM

This application claims the benefit to foreign application of India, Appln. Ser. No. 201631043907, filed Dec. 22, 2016, the entire contents of which is hereby incorporated by reference as if fully set forth herein, under 35 U.S.C. § 119.

FIELD OF THE DISCLOSURE

The technical field of the disclosure is computer-implemented visual display of nodes and edges of a multiway graph. Another technical field of the disclosure is updating visual or graphical user interfaces that display portions of a multiway graph with selectively greater or lesser detail.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Data sets of interrelated data may be stored in data structures such as graphs. "Graph," in this context, is used in the computer science sense, to refer to representations of interconnected data. Graphs are structures used by computer applications to store data and the many relationships between the data. Data stored in graphs are stored within entities, called nodes, and the many relationships between the nodes are represented using connections called edges. For example, a social network may be represented as a graph where user accounts are represented as nodes and their friendships with other users are represented by an edge connecting two nodes.

Graphs of data may become increasingly complex when relationships between different nodes span different levels of hierarchy and different types of nodes. Visually displaying such complex graphs has become increasingly difficult when graphs contain many complex inter-relationships between nodes. Such a problem may result in a visual display that contains too many interrelationships between nodes to be readable. A graph displaying several nodes and edges may result in a user not understanding which nodes have relationships with other nodes.

One solution to a crowded visual display of a complex graph is to display only a subset of the nodes and edges within a graph. However, when displaying subsets of a graph the user may miss crucial relationships or may become lost between several different partial displays. Therefore some form of visual display, which clearly illustrates relationships between nodes and is able to easily be traversed, is needed.

DETAILED DESCRIPTION

Figure 1:
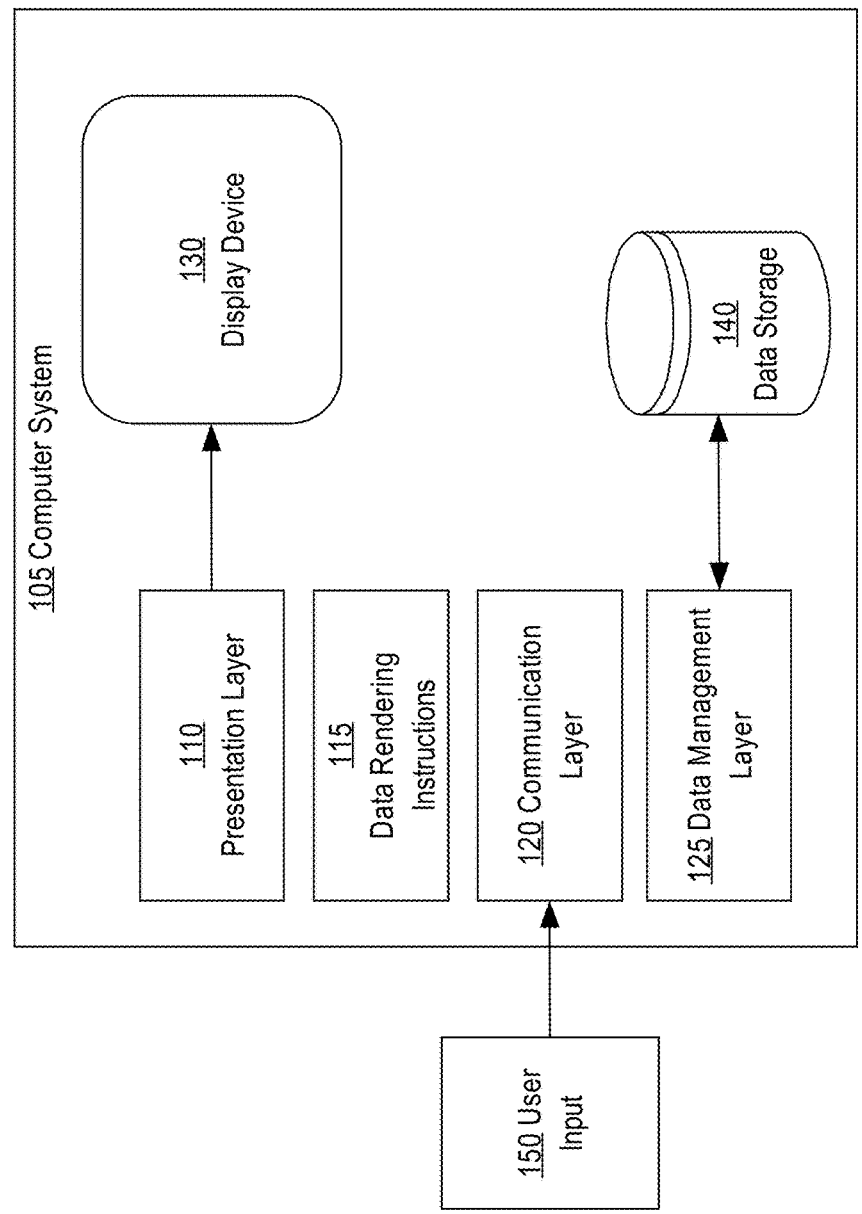
FIG. 1 illustrates an example computer system that is configured to visually display, on a computer display device, nodes and their respective relationships with other nodes.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Aspects of the disclosure generally relate to computer-implemented techniques for generating a visual illustration of data organized in a multiway graph. In an embodiment, a computer system is configured and programmed to maintain, within digital computer memory, a plurality of nodes and edges, within a multiway graph. Each node in the plurality of nodes represents a respective entity of data and is connected to one or more neighbor nodes with one or more edges. Edges may represent relationships between two nodes. The computer system is configured and programmed to display, on a display device, a visual user interface of one or more nodes and relationships between the nodes. The display may contain a first node positioned at the center of the visual user interface and one or more child nodes, displayed as first-shaped polygons, positioned at radially symmetric positions surrounding the first node. The one or more child nodes of the first node are direct neighbor nodes of the first node, connected by an edge.

The computer system is configured and programmed to receive, from a user using the visual user interface, a first input that specifies a selection of a first child node, from the one or more child nodes displayed in the visual user interface. In response to receiving the first input, the computer system is configured and programmed to update the visual user interface to display: the first node, positioned at the center of the visual user interface; the one or more child nodes, displayed as first-shaped polygons positioned at radially symmetric positions surrounding the first node; the first child node positioned within the radially symmetric positions surrounding the first node below the first node; and one or more grandchild nodes, which are direct neighbor nodes of the first child node, displayed as second-shaped polygons each positioned at radially symmetric positions around a circular area surrounding the one or more child nodes.

The term "visual user interface," when used alone herein, should be considered equivalent to "graphical user interface" or GUI, when used alone. The term "visual user interface" is preferred in this disclosure to avoid confusion with the different term "graph," as in a graph of nodes and edges. A visual user interface, in any embodiment of this disclosure, can include any form of visual display that can be depicted on or driven to a computer display device and can display lines, arcs and polygons in any geometric relationship; various embodiments may use a windowed display, GUI display, vector graphics, raster display, and so forth. The disclosure will establish that a particular or applied visual user interface is provided in embodiments, having specific features and characteristics, rather than a generic display.

Structural Overview

FIG. 1 illustrates an example computer system that is configured to visually display, on a computer display device, nodes and their respective relationships with other nodes. Computer system 105 represents a computer system configured and programmed to store, query, and generate a visual representation of data in nodes organized within a data structure. Embodiments of the computer system 105 include, but are not limited to, a standalone computer system that includes data storage and display components, a multiple computer server system with multiple components configured and implemented and multiple computer systems, and a multiple computer server system with multiple components configured and implemented on server systems located within a cloud server.

In an embodiment, the computer system 105 includes a presentation layer 110, data rendering instructions 115, a communication layer 120, a data management layer 125, a display device 130, and data repository 140. The presentation layer 110, data rendering instructions 115, the communication layer 120, and the data management layer 125 each comprise executable instructions loaded into a set of one or more pages of main memory, such as RAM, in the computer system 105 which when executed cause the computer system 105 to perform the functions or operations that are described herein. For example, the data rendering instructions 115 may comprise executable instructions loaded into a set of pages in RAM that contain instructions which when executed cause performing data rendering functions that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, JAVASCRIPT libraries, other scripting languages, and other programming source text. The term "pages" is intended to refer broadly to any region within main memory and the specific terminology used in a system may vary depending on the memory architecture or processor architecture.

In another embodiment, the presentation layer 110, data rendering instructions 115, the communication layer 120, and the data management layer 125 may represent one or more files or projects of source code that are digitally stored in a mass storage device such as non-volatile RAM or disk storage, in the computer system 105 or a separate repository system, which when compiled or interpreted cause generating executable instructions which when executed cause the computer system 105 to perform the functions or operations that are described herein with reference to those modules. In other words, the drawing figure may represent the manner in which programmers or software developers organize and arrange source code for later compilation into an executable, or interpretation into bytecode or the equivalent, for execution by the computer system 105.

In an embodiment, the presentation layer 110 may include instructions to generate a visual user interface (GUI) to be displayed on the display device 130. The GUI may comprise controls for inputting user input that may be used to update or generate a new display of data within the GUI.

In an embodiment, the data rendering instructions 115 may include instructions to generate a visual display that illustrates one or more nodes of data and their relationships based upon a data structure stored within data repository 140 and user input 150 that specifies the configuration of the visual display depending upon the nodes selected to display.

In an embodiment, the communication layer 120 may include instructions to perform input/output interfacing functions including receiving user input 150 that specifies user requests for displaying specific nodes of data.

In an embodiment, the data management layer 125 may include instructions to perform functions that manage read operations and write operations involving the data repository 140 and other functional elements of the system, including queries and result sets communicated between the functional elements of the system and the data repository 140. Examples of data management layer 125 include JDBC, SQL server interface code, and/or HADOOP interface code, among others. The data repository 140 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

In an embodiment, the display device 130 may include, but is not limited to, a computer display screen, a computer projection screen, a mobile device screen, or any other digital display configured to present visual illustrations of data. The visual representation of the data objects and their relationships are then displayed on the display device 130 for a user to view. In an embodiment, user input 150 represents input from a user or other computer system, external to the computer system 105, to update or modify the current visual display on the display device 130.

Functional Overview

Figure 8:
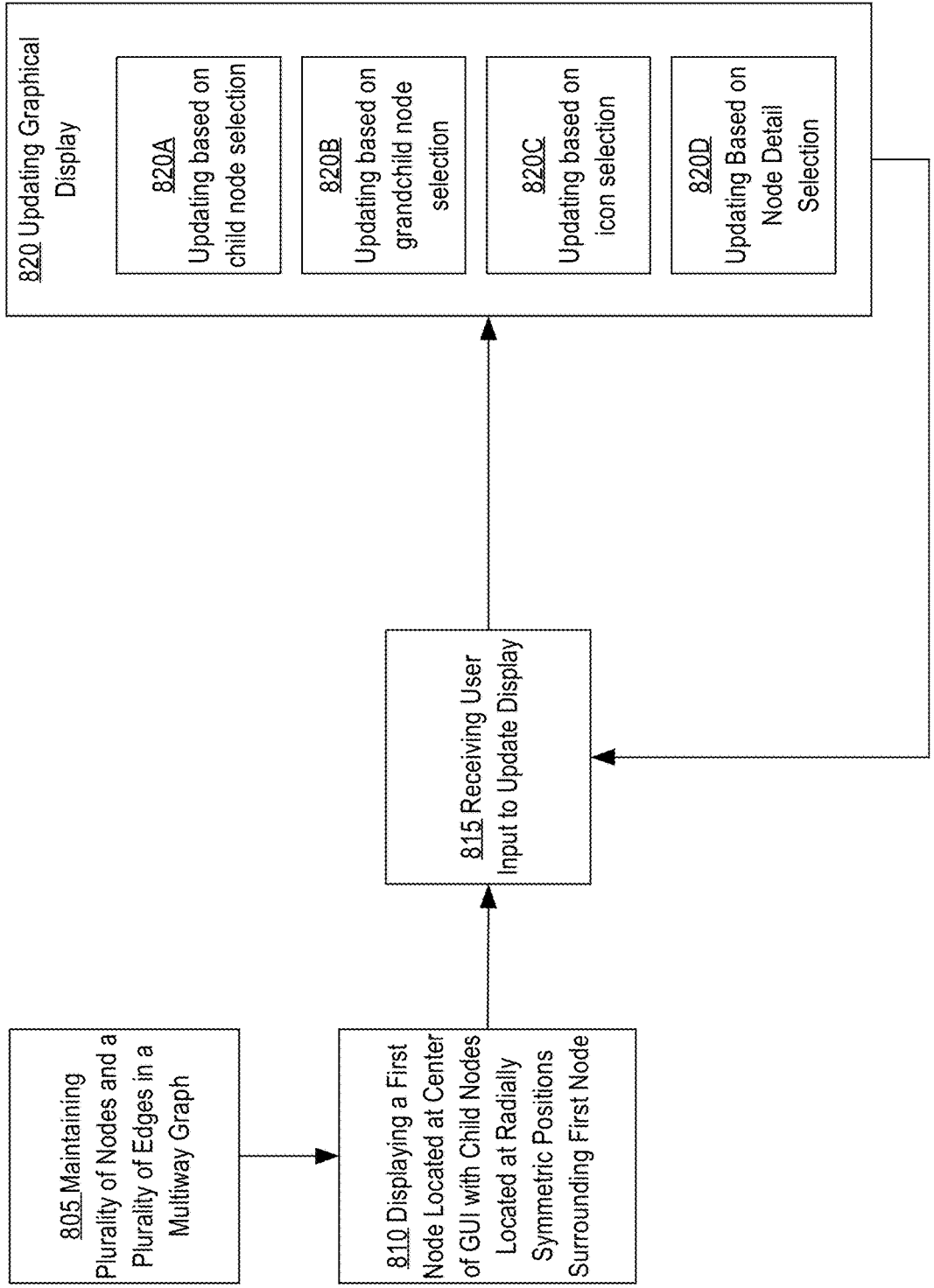
FIG. 8 example embodiment of a flow diagram for displaying and updating a visual display of stored data nodes.

FIG. 8 depicts a detailed example flow diagram of maintaining a multiway graph, visually displaying a node and related nodes, and receiving user input that may update the visual display of nodes based upon the user input.

In an embodiment, a multiway graph is a collection of nodes and edges. A node may represent one of many different types objects while edges that connect two nodes in the multiway graph may represent one of many different types of relationships between the nodes.

One example of data stored in the multiway graph is governance, risk management, and compliance (GRC) data. GRC is a corporate objective for businesses to improve compliance of business practices with existing regulatory requirements by defining governance policies, risk management objectives, and compliance policies of various aspects of a business. Companies typically keep track of business strategies by relating said strategies to risk management processes and compliance regulations. In order to effectively manage GRC, interrelated business processes, projects, and transactions are stored and configured within a multiway graph in order to represent the multiple relationships between the different types of business areas. In this example, nodes may represent different types of GRC data from projects and reports to lists of individual compliance tasks related to specific business transactions. Each of these nodes may be interrelated to other nodes including, but not limited to, different regulatory aspects and larger nodes that encapsulate subject matter covering multiple specific nodes.

Another example of data stored within a multiway graph is user accounts provided by a social network provider, such as Facebook, Google+, LinkedIn, and Twitter. A node may represent user accounts and edges in the multiway graph may represent an established relationship between two user accounts, such as being friends or "following" another user account on Twitter. Examples of user accounts are not limited to user accounts associated with social network providers. For example, a multiway graph of user accounts may represent internally stored user accounts within a data storage system. In yet another example, nodes in a multiway graph may represent a network, such as the Internet, and edges in the graph may represent that computing devices are physically coupled to each other.

At block 805 in FIG. 8, the computer system 105 maintains the multiway graph containing nodes and edges. In an embodiment, the data management layer 125 maintains the multiway graph, which is stored within the data repository 140. Maintenance of the multiway graph includes, but is not limited to, managing read and write operations related to queries and updates on one or more nodes stored within the multiway graph.

In an embodiment, the data management layer 125 may maintain multiple multiway graphs storing different types of data. For example, one multiway graph may contain regulatory information related to business A and another multiway graph may contain regulatory information related to business B. The data management layer 125 may manage updates and queries to both multiway graphs.

In an alternative embodiment to the multiway graph, the data management layer 125 may maintain other types of data structures, such as a hierarchal tree. The data management layer 125 may maintain a hierarchal tree or other type of data structure stored within the data repository 140.

At block 810, a first node and child nodes of the first node are displayed within a GUI on the display device 130. In an embodiment, the data management layer 125 provides instructions to query the multiway graph stored in the data repository 140. The result set of the query includes a first node and a set of child nodes. The set of child nodes are neighboring nodes connected to the first node by an edge. In an embodiment, the first node may represent top level node or starting point for exploring nodes within the multiway graph. For example, in the multiway graph that contains GRC data, the first node may represent a GRC data starting point where different types of GRC subject matter may be accessed. Different GRC subjects may include, but is not limited to, business objectives, audits, auditable entries, assets, asset classes, controls, control objectives, and checklists. Each of these subjects may be represented as a child node to the first node. In an embodiment, the child nodes of the first node are neighboring nodes that are connected to the first node by an edge.

In an embodiment, the data rendering instructions 115 provide instruction to generate a visual representation of the first node and child nodes retrieved by the data management layer 125. The visual representation of the first node and the child nodes generated by the data rendering instructions 115 are configured such that a user is able to clearly visualize the relationships between the first node and child nodes without being overwhelmed by the number of child nodes displayed and the information conveyed by each node. In an embodiment, the presentation layer 110 provides instructions to display within a GUI the visual representation of the first node and child nodes on the display device 130.

In an embodiment, the data rendering instructions 115 provide instructions to generate a visual display that displays the first node positioned at the center point of the visual display with the child nodes positioned at radially symmetric positions surrounding the first node.

Figure 2:
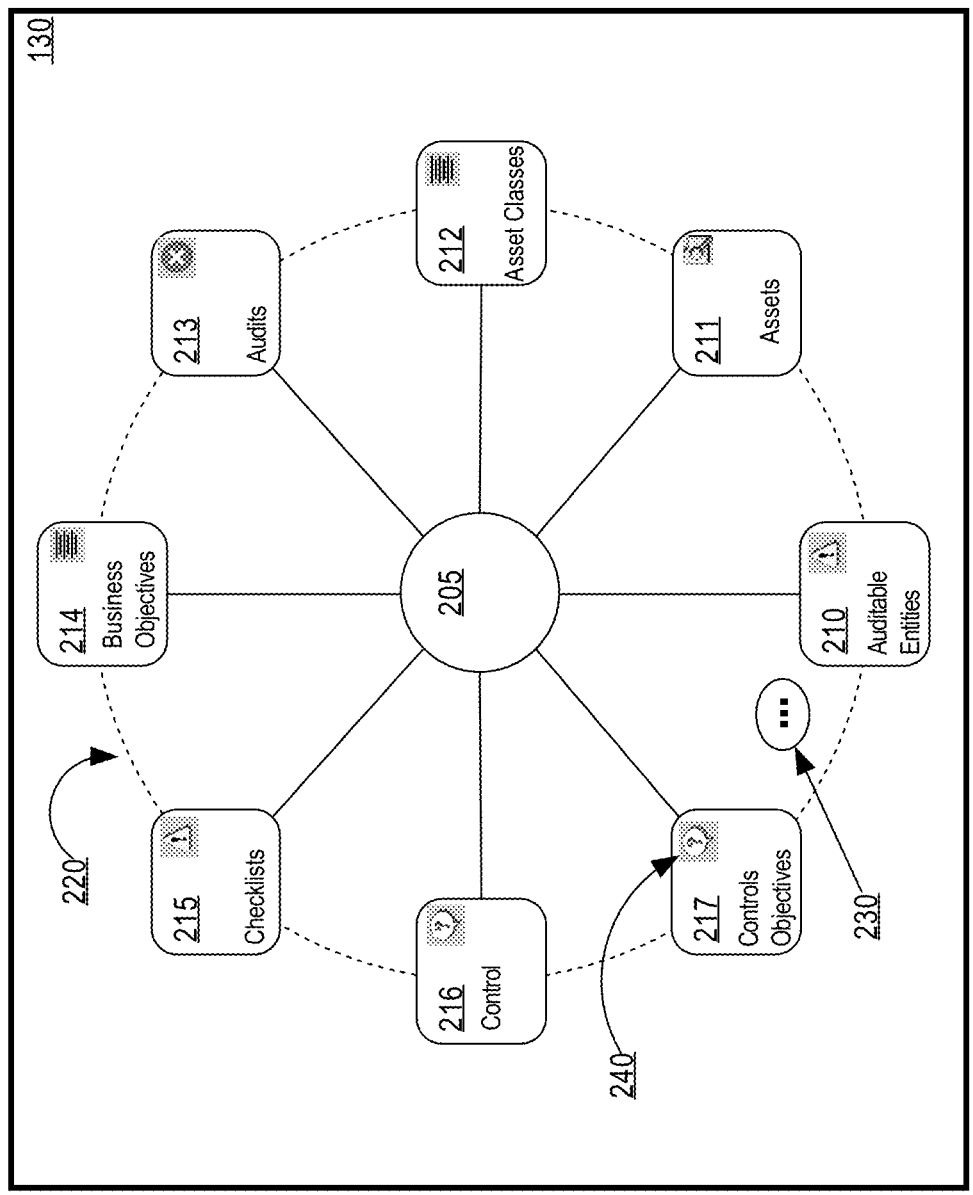
FIG. 2 depicts an example embodiment of the visual display with the first node positioned at the center and the child nodes positioned at radially symmetric positions surrounding the first node.

FIG. 2 depicts a sample embodiment of the visual display with the first node positioned at the center and the child nodes positioned at radially symmetric positions surrounding the first node. First node 205 depicts the first node, which is positioned at the center point of the visual display. Positioning the first node 205 at the center point conveys to the user the current level, within the graph hierarchy, that the visual display currently represents. Each of the child nodes 210, 211, 212, 213, 214, 215, 216, 217 is positioned at radially symmetric positions around the first node 205. Dotted circle 220 is a circle that surrounds first node 205 and is used to represent direct connections between the first node 205 and child nodes 210, 211, 212, 213, 214, 215, 216, 217 of the first node 205. Each of the child nodes 210, 211, 212, 213, 214, 215, 216, 217 is positioned along the dotted circle 220. The dotted circle 220 is shown as an aide in illustrating the radially symmetric positioning of the each of the child nodes 210, 211, 212, 213, 214, 215, 216, 217 and may or may not be part of the visual representation displayed on display device 130.

In an embodiment, each of the child nodes 210, 211, 212, 213, 214, 215, 216, 217 may be represented using a shaped polygon, such as a rectangular box with rounded edges. The rectangular box illustrates that each of the child nodes 210, 211, 212, 213, 214, 215, 216, 217 represent separate and distinct nodes from first node 205. In other embodiments, child nodes 210, 211, 212, 213, 214, 215, 216, 217 may be represented using any other polygon shape that distinguishes each of the child nodes 210, 211, 212, 213, 214, 215, 216, 217 from the first node 205. In yet other embodiments, the child nodes may be distinguishable from the first node 205 using a variety of visual cues including, but not limited to, polygon shapes of the nodes, color differences of the nodes, and size differences of the nodes.

In an embodiment, FIG. 2 shows solid lines connecting the first node 205 to the child nodes 210, 211, 212, 213, 214, 215, 216, 217. The solid lines represent a direct relationship between the first node 205 and the child nodes 210, 211, 212, 213, 214, 215, 216, 217, where the child nodes 210, 211, 212, 213, 214, 215, 216, 217 are neighboring nodes to the first node 205 in the multiway graph. In other embodiments, relationships between neighboring nodes may be depicted with other types of lines, symbols, color highlighting, or any other visual effect that may convey a direct relationship between two visual objects.

In an embodiment, the child nodes 210, 211, 212, 213, 214, 215, 216, 217 each represent a distinct entity within the multiway graph. For example, child node 210 may represent Auditable Entities, which may include different business areas that may require auditing and child node 210 may have edge relationships to other nodes that contain data for the different auditable entities. Child node 211, labeled Assets, may contain information and edge relationships to other nodes that represent the available assets within the multiway graph. Child node 212, labeled Asset Classes, may contain information on the different asset class types and edge relationships to other nodes that represent each of these asset class types. Child node 213, labeled Audits, may contain information related to existing audits and edge relationships to other nodes that represent each of the available audits. Child node 214, labeled Business Objectives, may contain information related to the available business strategies and edge relationships to other nodes for each of those business strategies. Child node 215, labeled Checklists, may contain information regarding the existing checklists related to GRC and edge relationships to nodes representing each of the existing checklists. Child node 216, labeled Controls, may contain information related to control mechanisms for GRC data and edge relationships to nodes representing each of the different types of control mechanisms. Child node 217, labeled Control Objectives, may contain information related to business objectives related to control mechanism and edge relationships to nodes representing each of the different control objectives.

In an embodiment, icon 240 may be used to visually convey information about the data related to a specific node. Information conveyed by icon 240 may include, but is not limited to, whether the node contains actionable items that require attention, the level of urgency related to the node, or the type of data in the node. For example, if the icon is an "X" within a circle then the icon may convey that the node contains items that require immediate attention. If however, the icon is a question mark, then the icon may convey that the node contains data that either has not been classified or is unable to be classified. Other examples of icon 240 may include different types of icons to convey different types of information about the node and information about other nodes related to that node.

In an embodiment, child nodes displayed in the visual display may be limited to a specific number of child nodes so that the user is able to clearly recognize and distinguish information for a child node from the other child nodes displayed. The visual display depicted in FIG. 2 only displays 8 child nodes, child nodes 210, 211, 212, 213, 214, 215, 216, 217. Icon 230 may represent additional child nodes to first node 205 not currently displayed. In FIG. 2, icon 230 is shaped as an oval with an ellipse within the oval. In other embodiments, the icon 230 may be represented as any configurable polygon shape. In an embodiment, the user may display additional child nodes by clicking on the icon 230 which may display a drop down box containing additional child nodes. In another embodiment, clicking on the icon 230 may result in a drop down box displaying a list of all the child nodes.

Generating and causing displaying a visual or graphical display or interface of the type shown in FIG. 2 may be programmed using calls to a graphics function library or other code that is programmed or configured to support drawing arcs, lines and polygons as part of a rendered electronic document, by delivering instructions to a graphics chipset, or by directly driving a display device. For example, the lines, arcs, circle, ellipse and rectangles shown in FIG. 2 may be created by a program, which implements FIG. 8, calling a graphics function library to invoke particular methods with parameters that will result in rendering a set of HTML code, other script or source code, or driving instructions for a chipset or display.

Figure 5:
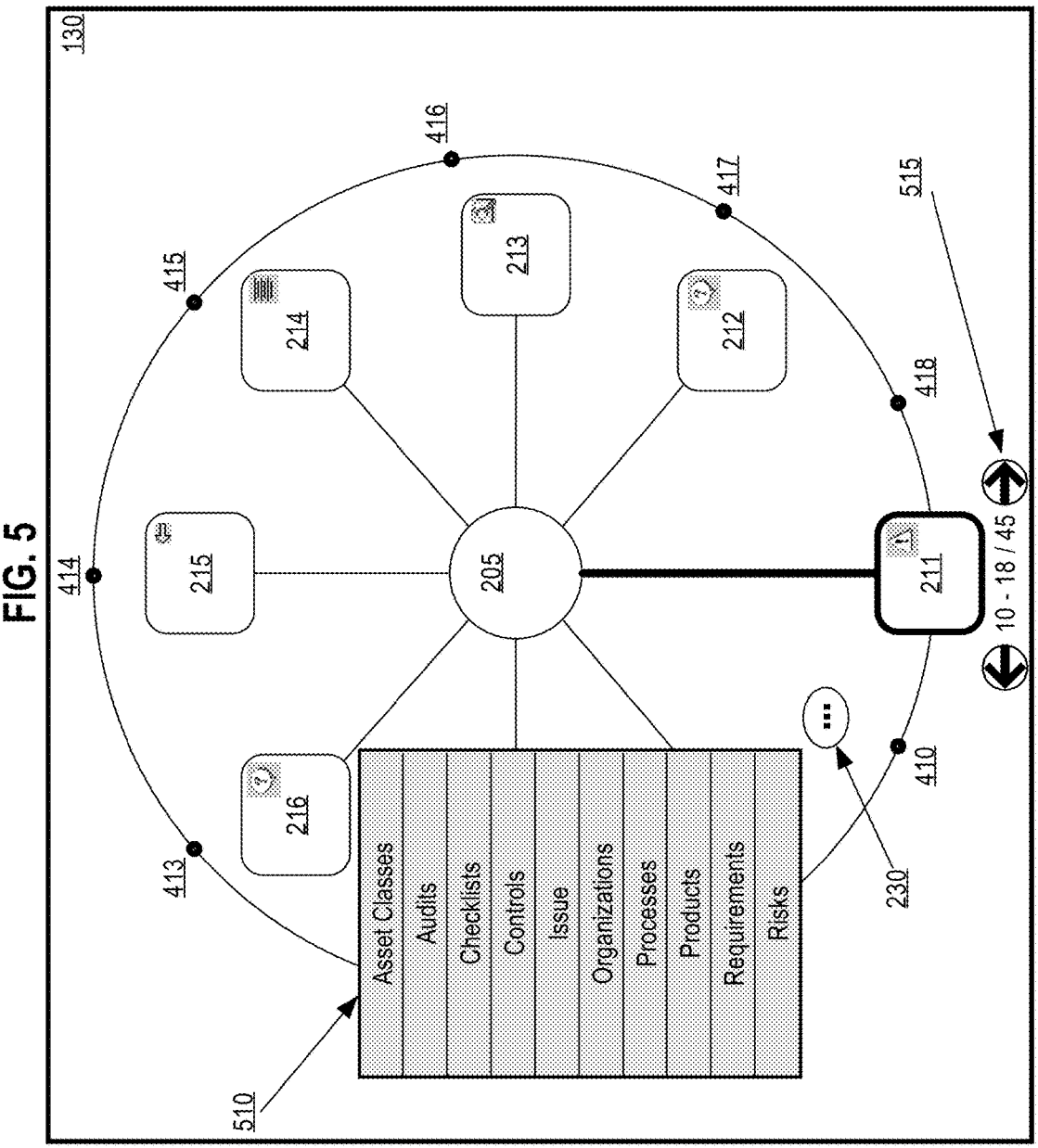
FIG. 5 depicts an example embodiment of a visual display showing a drop down list of child nodes.

FIG. 5 depicts an example of the user clicking on the icon 230. After the user clicks on the icon 230, a dropdown list 510 is displayed showing the additional child nodes to first node 205. In other embodiments, clicking the icon 230 may result in displaying the additional child nodes in either a popup window or may result in redrawing the visual display with the additional child nodes positioned radially around the first node 205. In another embodiment, page selection icon 515 may be used to cycle between additional child nodes not displayed within the visual display. After selecting one of the arrows in the page selection icon 515, the visual display may be updated to display the next set of eight child nodes.

Referring back to FIG. 8, at step 815 the computer system 105 receives user input to update the visual display. In an embodiment, the communication layer 120 receives the user input 150 and sends the user input 150 to the data management layer 125 to retrieve data needed to update the visual display. The user input 150 may include, but is not limited to, selecting a node from the existing visual display, selecting an icon to display additional information related to a particular node, or selecting an icon to display additional child nodes of the first node 205 from the existing visual display.

At step 820, the computer system 105 updates the visual display based upon the user input 150 received at step 815. In an embodiment, updating the visual display, displayed on display device 130, may include retrieving additional nodes and node information from the multiway graph stored in the data repository 140.

Step 820A depicts an embodiment of updating the visual display based upon receiving user input 150 that is a selection of a child node. For example, if user input 150 is a selection of a particular node from the existing visual display, such as child node 210 in FIG. 2, then the visual display may be updated by showing additional nodes that neighbor child node 210. In this scenario, the data management layer 125 may query the multiway graph stored in the data repository 140 for nodes that are direct neighbors of child node 210. The data management layer 125 may then send a dataset of nodes that are direct neighbors of child node 210 to the data rendering instructions 115. In another embodiment, the data management layer 125 may send a dataset of nodes that contains the first node 205, the child nodes 210, 211, 212, 213, 214, 215, 216, 217, and neighboring nodes of child node 210 to the data rendering instructions 115.

Figure 3:
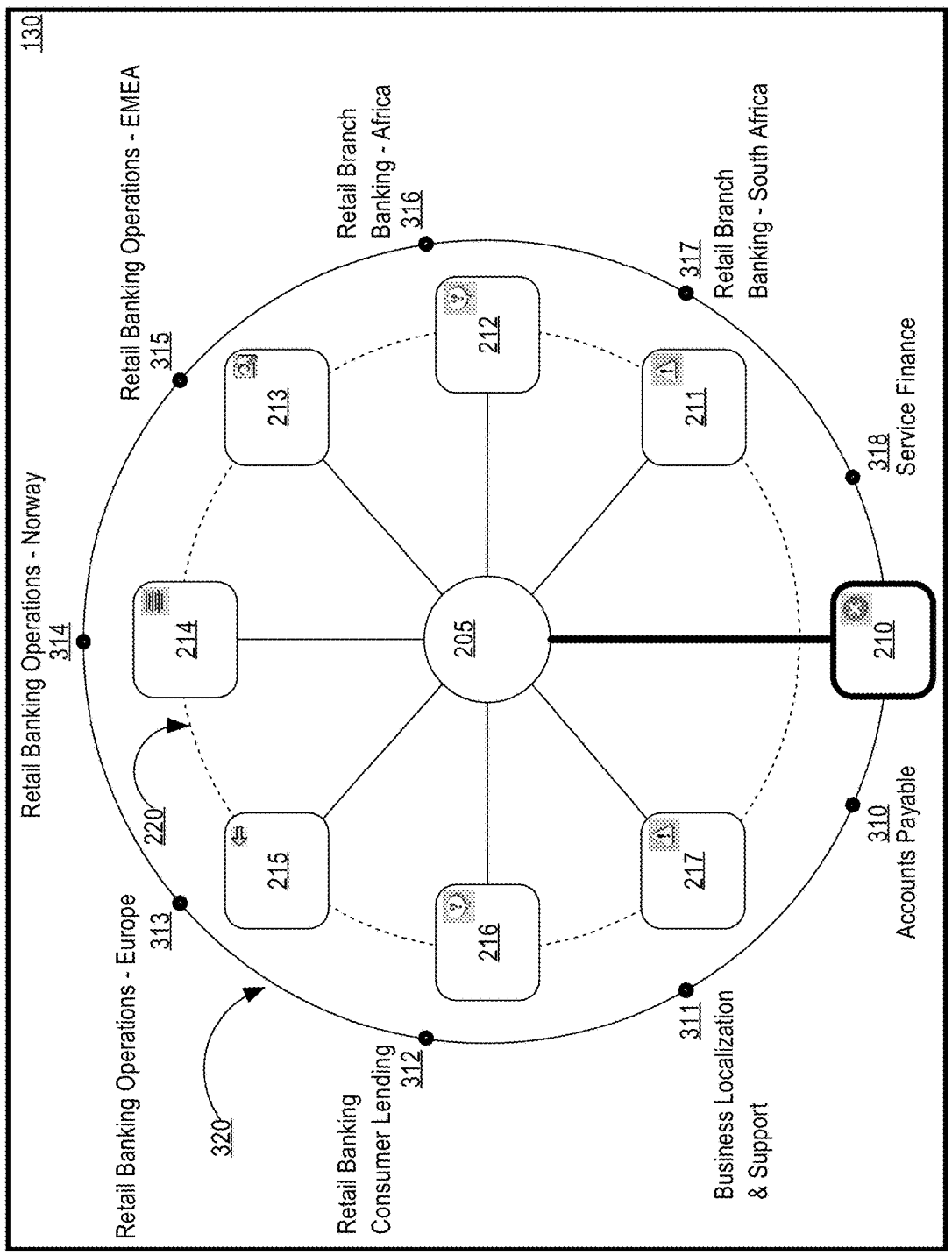
FIG. 3 depicts an example embodiment of an updated visual display displaying the first node, child nodes, and grandchild nodes of a selected child node.

In an embodiment, the data rendering instructions 115 generate an updated visual display that includes the dataset of neighboring nodes of child node 210. FIG. 3 depicts an example embodiment of the updated visual display, as presented by the presentation layer 110 onto the display device 130. The updated visual display generated by the data rendering instructions 115 includes the first node 205 positioned at the center of the visual display. Each of the child nodes 211, 212, 213, 214, 215, 216, 217 is positioned at radially symmetric positions around the first node 205. In an embodiment, the child node 210 is displayed differently from the other child nodes 211, 212, 213, 214, 215, 216, 217 to indicate that child node 210 is the child node selected from user input 150. FIG. 3 shows an embodiment of child node 210 as the selected node by generating the rectangle-shaped polygon for child node 210 with an increased border thickness and increased thickness of the line connecting child node 210 and first node 205. By increasing the thickness of the connecting line and the border around child node 210, the user is able to identify child node 210 as the selected child node. In other embodiments, child node 210 may be shown by either highlighting child node 210 a color different from the other child nodes or by highlighting the pixels surrounding child node 210 and connector line between first node 205 and child node 210. In an embodiment, child node 210 is positioned under first node 205 and is positioned below the dotted circle 220 to further indicate to the user that child node 210 is the selected child node. Other embodiments of visually displaying a selected node may include, but are not limited to, configuring different shapes for the selected node, different types of border styling for the selected node, different positioning of the selecting node, and different types of styling for the line connecting the selected node to the first node 205.

In an embodiment, the dataset of neighboring nodes of child node 210 are displayed along a circular ring 320 that surrounds the child nodes 211, 212, 213, 214, 215, 216, 217 and the first node 205. Neighboring nodes of selected child node 210 may be referred to as grandchild nodes 310, 311, 312, 313, 314, 315, 316, 317, 318 because they have a second-degree relationship to the node centered in the visual display, the first node 205. The grandchild nodes 310, 311, 312, 313, 314, 315, 316, 317, 318 and selected child node 210 are positioned at radially symmetric positions along the circular ring 320. By positioning child node 210 along the circular ring 320 with grandchild nodes 310, 311, 312, 313, 314, 315, 316, 317, 318, the visual display conveys a direct relationship between child node 210 and the grandchild nodes 310, 311, 312, 313, 314, 315, 316, 317, 318.

In an embodiment, each of the grandchild nodes 310, 311, 312, 313, 314, 315, 316, 317, 318 is displayed as bullet point symbols along the circular ring 320 with floating text descriptions that describe each of the grandchild nodes. For example in FIG. 3, grandchild node 314 includes floating text describing the grandchild node 314 as "Retail Banking Operations—Norway" and grandchild node 313 includes floating text "Retail Banking Operations—Europe." Proximity between the bullet point symbol of a grandchild node and the associated floating text description may vary depending on the size of the visual display, the number of grandchild nodes displayed, and the length of the text description. By varying the proximity between the bullet point symbol and the text description the computer system 105 may be able to ensure clear and concise readability of grandchild node text descriptions. In other embodiments, grandchild nodes may be displayed using differently shaped polygons as the child nodes or differently shaped symbols other than the bullet point symbol.

In an embodiment, the updated visual display may be further updated when additional user input 150 is received. Referring back to FIG. 8, receiving additional user input 150 in response to displaying an updated visual display is represented by a feedback loop arrow from step 820 back to step 815. Step 815 represents receiving user input 150 to update the current visual display.

In an embodiment, user input 150 received at step 815 may represent a selection of another child node, other than the currently selected child node as displayed in the updated visual display. Referring back to FIG. 3, user input 150 received at step 815 may include the user selecting child node 211. The communication layer 120 may then send user input 150 to the data management layer 125. Step 820A may represent the data management layer 125 querying the multiway graph for nodes that are direct neighbors of child node 211. After retrieving the dataset of nodes that are direct neighbors of child node 211, the data rendering instructions 115 generate an updated visual display that includes the dataset of neighboring nodes of child node 211.

Figure 4:
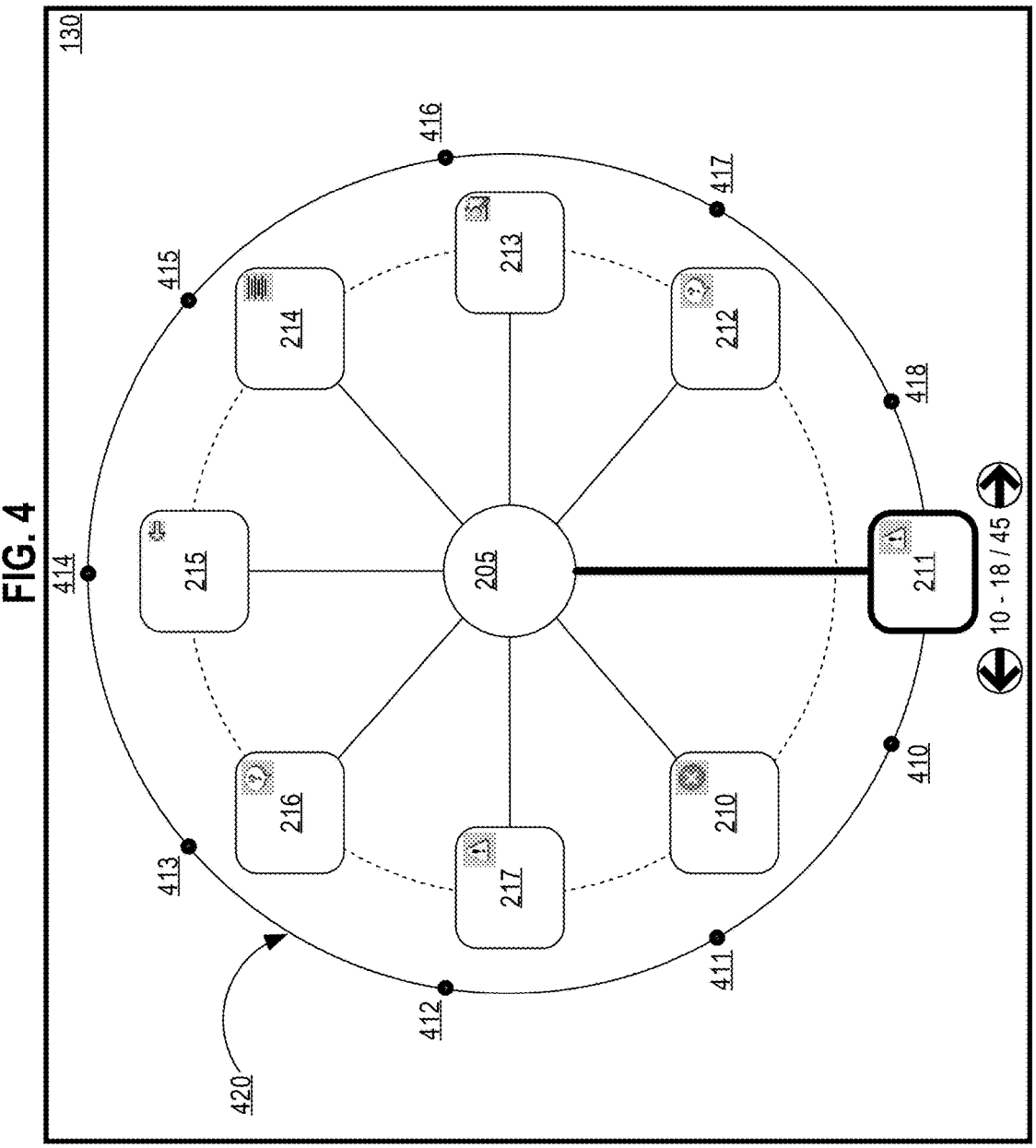
FIG. 4 depicts another example embodiment of an updated visual display displaying the first node, child nodes, and grandchild nodes of a different selected child node.

FIG. 4 represents an updated visual display generated by the data rendering instructions 115 that includes the first node 205, each of the child nodes 210, 211, 212, 213, 214, 215, 216, 217, and grandchild nodes 410, 411,412, 413, 434, 415, 416, 417, 418 that represent the direct neighbor nodes of child node 211. Positioning of child nodes 210, 211, 212, 213, 214, 215, 216, 217 has been updated so that selected child node 211 is under first node 205 and previously selected child node 210 has shifted left to the next position that is along dotted circle 220. Since child node 211 is now the selected child node, child node 211 may be displayed with an increased rectangular border thickness and increased thickness of the line connecting child node 211 and first node 205. The rectangular border thickness and connecting line thickness of previously selected child node 210 may be generated to have the same thickness as the other child nodes 212, 213, 214, 215, 216, 217 that are not currently selected. Selected child node 211 and grandchild nodes 410, 411,412, 413, 434, 415, 416, 417, 418 are positioned at radially symmetric positions along circular ring 420 to convey the direct relationship between child node 211 and grandchild nodes 410, 411,412, 413, 434, 415, 416, 417, 418. As described previously, style configurations of child node 211, when selected, is not limited to the described example above. When selected, child node 211 may be configured to be displayed using multiple different style configurations for positioning, node shape, node border, and the style of the connecting line to the selected child node 211.

Figure 6:
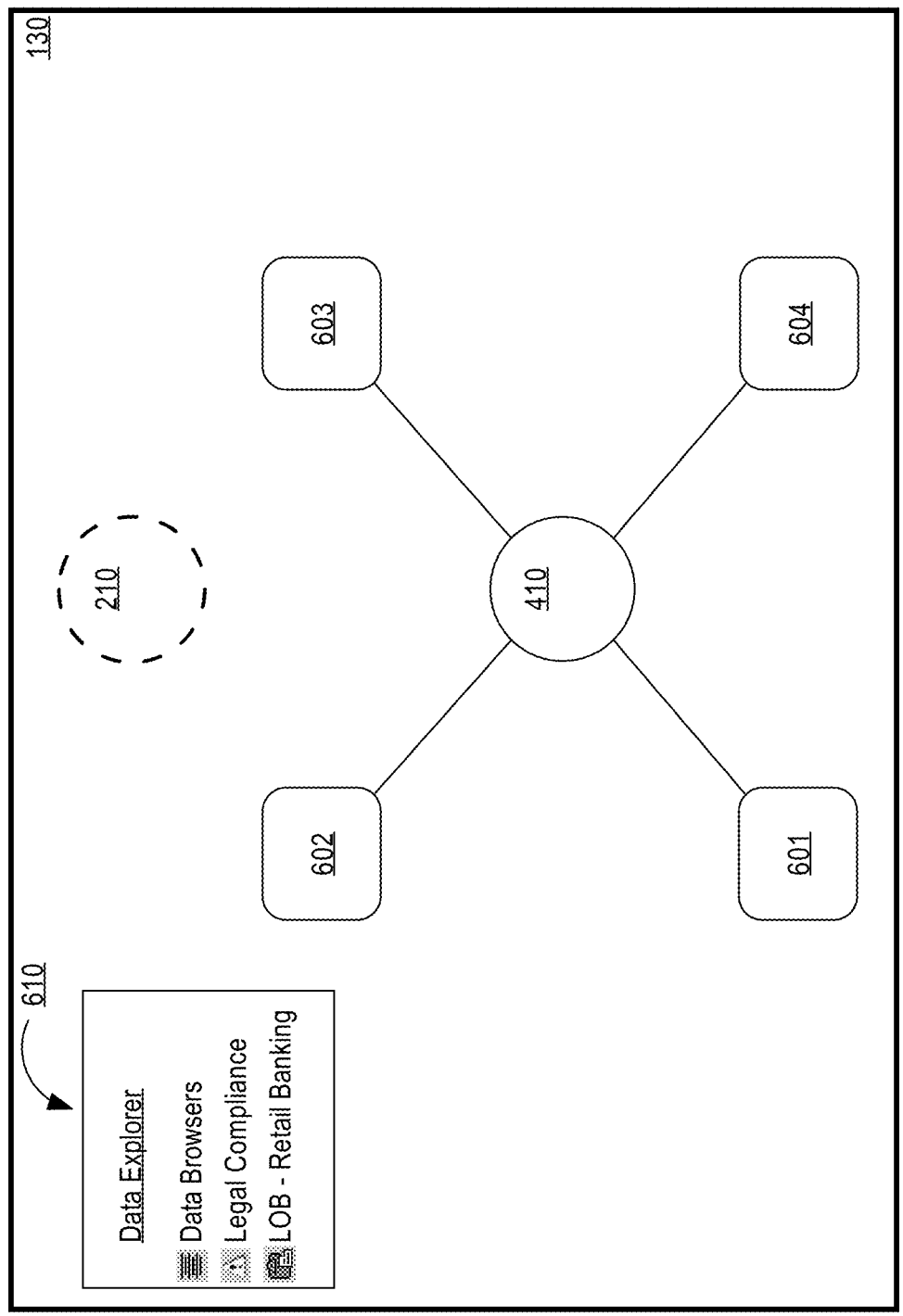
FIG. 6 depicts an example embodiment of a visual display with a selected grandchild node positioned at the center position of the visual display.

In an embodiment, selecting a grandchild node may result in updating the visual display to display a new graph with the selected grandchild node at the center position. Step 820B depicts an embodiment of updating the visual display based upon receiving user input 150 that is a selection of a grandchild node. Referring back to FIG. 4, if user input 150 is selecting grandchild node 410, then the communication layer 120 sends user input 150 to the data management layer 125. The data management layer 125 queries the multiway graph for nodes that are direct neighbors of selected grandchild node 410 and sends the dataset to the data rendering instructions 115. The data rendering instructions 115 generates an updated visual display that includes the selected grandchild node 410 at the center position and the direct neighbors of selected grandchild node 410 as child nodes. FIG. 6 depicts an embodiment of selected grandchild node 410 at the center. Child nodes 601, 602, 603, 604 represent the nodes that are direct neighbors of the selected grandchild node 410, except for child node 211. Each of the child nodes 601, 602, 603, 604 is positioned at radially symmetric positions around the selected grandchild node 410 and is visually represented as rectangle-shaped polygons with round edges. Each of the child nodes 601, 602, 603, 604 is connected to grandchild node 410 with a solid line.

In an embodiment, child node 211 is displayed as a sphere with a dashed-line border positioned in an area separate from grandchild node 410 and the radially symmetric child nodes 601, 602, 603, 604. Even though child node 211 is a direct neighbor of grandchild node 410, it is not displayed with child nodes 601, 602, 603, 604 because the relationship between child node 211 and grandchild node 410 was displayed in the previous visual display. By displaying child node 211 as a separate sphere the user is able to navigate back to the previous visual display containing the first node 201, child nodes 210, 211, 212, 213, 214, 215, 216, 217, and grandchild nodes 410, 411,412, 413, 434, 415, 416, 417, 418. In other embodiments, child node 211 may be configured with distinct visual cues that distinguish itself from the other nodes, such as a differently shaped polygon, styled border, different colors, or any other visually distinguishable characteristic.

In another embodiment, the visual display allows the user to navigate to visual displays that were previously displayed using a breadcrumbs table. Referring back to FIG. 6, data explorer table 610 represents a breadcrumbs table that contains a history of the visual displays viewed by the user.

Figure 7:
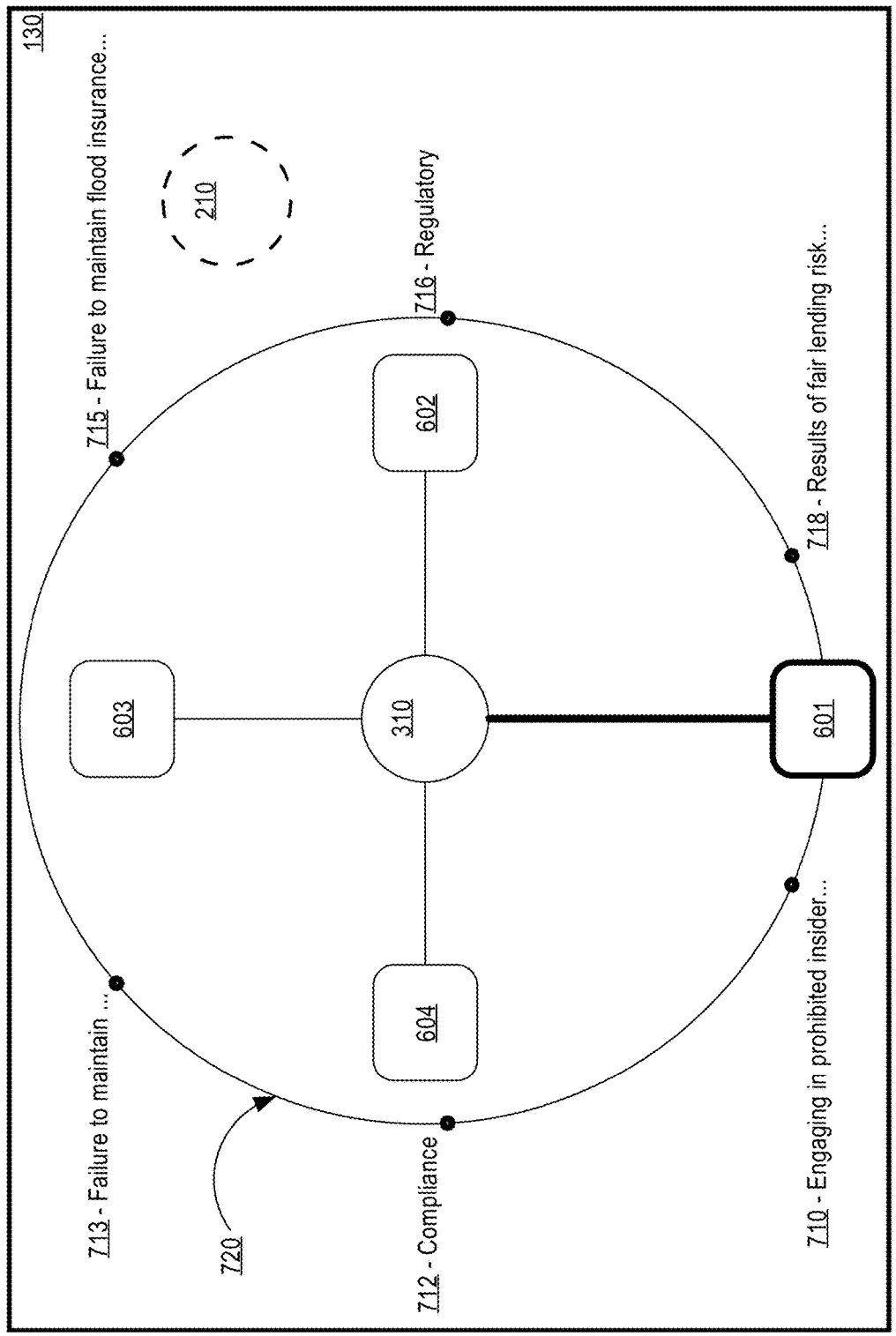
FIG. 7 depicts an example embodiment of a visual display with a selected grandchild node positioned at the center position, child nodes, and grandchild nodes of the selected grandchild node.

Similar to the previous examples for updating the visual display by selecting a child node, the visual display containing the selected grandchild node 410 at the center may be further updated to display additional neighboring nodes of one of the child nodes 601, 602, 603, 604. FIG. 7 depicts an embodiment of receiving user input 150, where user input 150 is a selection of child node 601. By selecting child node 601, the communication layer 120 sends user input 150 to the data management layer 125. The data management layer 125 then queries the multiway graph to retrieve a dataset of neighboring nodes for child node 601. The data rendering instructions then provide instruction to update the visual display to display the selected child node 601 and the neighboring nodes of child node 601. The neighboring nodes of child node 601 may be referred to as grandchild nodes 710, 711, 712, 713, 714, 715, 716, 717, 718. In FIG. 7, child node 601 is positioned below grandchild node 410 and is displayed with a thickened rectangular border and a thickened connector line between grandchild node 410 and child node 601. Child node 601 and grandchild nodes 710, 711, 712, 713, 714, 715, 716, 717, 718 are positioned along circular ring 720 at radially symmetric positions. Circular ring 720 surrounds child nodes 602, 603, 604 and grandchild node 411.

Referring back to FIG. 8, step 820C represents updating the visual display based on user input 150, which represents input for selecting an icon to update child nodes within a screen. For example, user input 150 may represent the user selecting either the icon 230 or the page selection icon 515, from FIG. 5. In an embodiment, the data rendering instructions 115 provide instruction to update the visual display to show additional child nodes of the node positioned at the center of the visual display.

In an embodiment, step 820D represents updating the visual display based upon the user hovering over a particular node. For example, if the user hovered over text for a particular child node or grandchild node, then the visual display may display an information icon or a clickable button that represents more information about the particular node. In an embodiment, if the user then clicked on the information icon then the communication layer 120 may receive the click action as user input 150, which would then be sent to the data management layer 125. The data management layer 125 may query the multiway graph to retrieve additional information for that particular node. The data rendering instructions 115 may then generate an information display that displays retrieved information for that particular node. In an embodiment, the information display may be displayed as a separate screen, a popup window, or any other window such that the user is able to associate the information displayed with the particular node selected.

Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
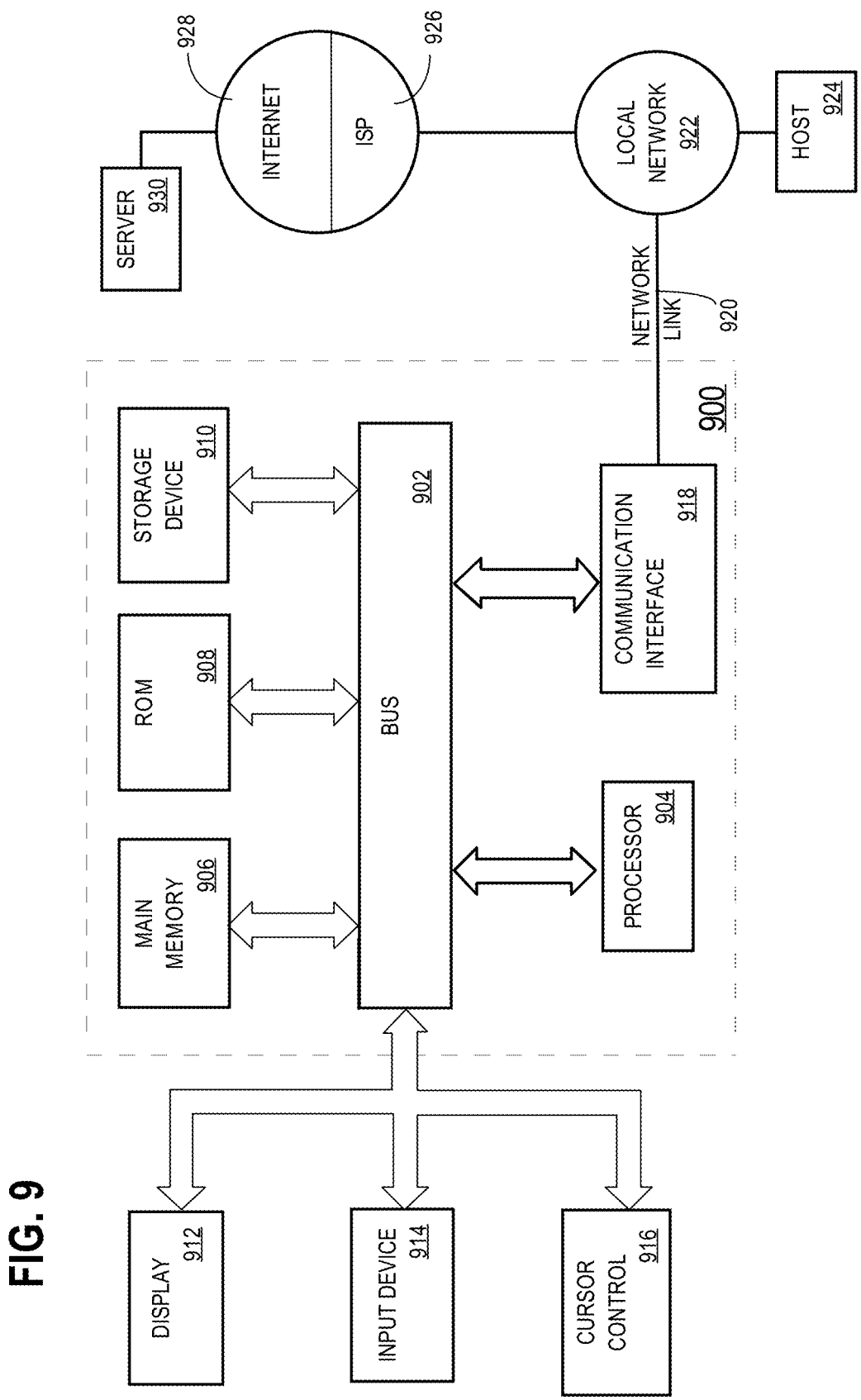
FIG. 9 illustrates an example computer system that may be configured to implement, individually or in cooperation with other computer systems, various technical steps described herein.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method for visually displaying on a computer display device data that is organized in digital computer memory as a multiway graph, comprising:
   maintaining in the digital computer memory, within the multiway graph, a plurality of nodes and a plurality of edges, wherein each node in the plurality of nodes represents a respective entity of a plurality of entities and is connected to one or more neighbor nodes with one or more edges of the plurality of edges;
   displaying, in a visual user interface of the computer display device;
   a first node positioned at a center of the visual user interface, and
   one or more child nodes, which are direct neighbor nodes of the first node, wherein the child nodes are displayed as first-shaped polygons each positioned at radially symmetric positions surrounding the first node;
   receiving, using the visual user interface, a first input that specifies a selection of a first child node from the one or more child nodes; and
   in response to receiving the first input, updating the visual user interface to display;
   the first node positioned at the center of the visual user interface,
   the one or more child nodes, other than the first child node, displayed as first-shaped polygons each positioned at radially symmetric positions around a first common circular area surrounding the first node, and
   one or more first grandchild nodes, which are direct neighbor nodes of the first child node, other than the first node, displayed as second-shaped polygons each positioned at radially symmetric positions around a second common circular area surrounding the one or more child nodes, wherein the first child node is positioned below the first node in the second common circular area surrounding the one or more child nodes.

2. The computer-implemented method of claim 1, further comprising:
   receiving, in the visual user interface, a second input that specifies a selection of a second child node from the one or more child nodes;
   in response to receiving the second input, updating the visual user interface to display;
   the first node positioned at the center of the visual user interface, the one or more child nodes, other than the second child node, displayed as first-shaped polygons each positioned at radially symmetric positions around the first common circular area surrounding the first node, wherein the first child node is positioned, within the radially symmetric positions around the first common circular area surrounding the first node at a radially symmetric position other than directly below the first node, and one or more second grandchild nodes, which are direct neighbor nodes of the second child node, other than the first node, displayed as second-shaped polygons each positioned at radially symmetric positions around the second common circular area surrounding the one or more child nodes, wherein the second child node is positioned below the first node in the second common circular area surrounding the one or more child nodes.

3. The method of claim 2, further comprising:

receiving, in the visual user interface, a third input that specifies a selection of a second grandchild node from the one or more second grandchild nodes; and in response to receiving the third input, updating the visual user interface to display;

the selected second grandchild node at the center of the visual user interface, one or more great-grandchild nodes, displayed as first-shaped polygons each positioned at radially symmetric positions surrounding the selected second grandchild node, and the second child node positioned at a location, within the visual user interface, that is distinct from the radially symmetric positions surrounding the selected second grandchild node and the center of the visual user interface, wherein the second child node is displayed as a polygon with a circular dashed-lined border that delineates an area corresponding to the second child node from areas corresponding to the selected second grandchild node and the radially symmetric positions surrounding the selected second grandchild node.

4. The method of claim 3, further comprising:

receiving, in the visual user interface, a fourth input that specifies hovering over a second grandchild node; and in response to receiving the fourth input, displaying a detail icon adjacent to the second grandchild node, which when selected updates the visual user interface to display a summary form of data comprising data stored within the second grandchild node and data associated with the second grandchild node.

5. The method of claim 1, further comprising displaying, in response to receiving the first input, in association with each of the one or more child nodes displayed as first-shaped polygons, one or more respective text descriptions of the one or more child nodes;

wherein each of the first-shaped polygons are connected to the first node by a solid line; and wherein the first-shaped polygon corresponding to the first child node is connected to the first node by a thick solid line, which is thicker in width than the solid line.

6. The method of claim 5, wherein each of the first-shaped polygons corresponding to the one or more child nodes each contain a visual icon having a distinct form from among a plurality of forms and corresponding to a type of data contained within each corresponding child node.

7. The method of claim 1, wherein updating the visual user interface further comprises:

displaying two or more text descriptions each associated with a first grandchild node of the first grandchild nodes and positioned at a calculated proximity from the associated first grandchild node of the one or more grandchild nodes such that spacing between each text description of the two or more text descriptions is equidistant.

8. The method of claim 1, wherein displaying in the visual user interface further comprises:

displaying a subset of the one or more child nodes as the first-shaped polygons each positioned at radially symmetric positions surrounding the first node when the one or more child nodes, which are direct neighbor nodes of the first node, exceed a configured threshold of displayable nodes;

wherein a number of the child nodes, within the subset of the one or more child nodes, does not exceed the configured threshold;

displaying an icon adjacent to one of the child nodes within the subset of the one or more child nodes; and in response to receiving input selecting the icon, displaying a dropdown list of other child nodes from the one or more child nodes, other than the child nodes within the subset of one or more child nodes.

9. The method of claim 1, wherein updating the visual user interface further comprises:

displaying a subset of the one or more first grandchild nodes as third-shaped polygons each positioned at radially symmetric positions around the second common circular area surrounding the one or more child nodes when the one or more first grandchild nodes, which are direct neighbor nodes of the first child node, other than the first node, exceed a configured threshold of displayable nodes;

wherein a number of grandchild nodes, within the subset of the one or more first grandchild nodes, does not exceed the configured threshold; and displaying page selection icons, positioned below the second common circular area surrounding the one or more child nodes.

10. A data processing system comprising:

a memory;

one or more processors coupled to the memory;

a non-transitory computer-readable medium that stores instructions which, when executed by the one or more processors, cause performance of:

maintaining in memory, within a multiway graph, a plurality of nodes and a plurality of edges, wherein each node in the plurality of nodes represents a respective entity of a plurality of entities and is connected to one or more neighbor nodes with one or more edges of the plurality of edges;

displaying, in a visual user interface of a computer display device;

a first node positioned at a center of the visual user interface, and one or more child nodes, which are direct neighbor nodes of the first node, wherein the child nodes are displayed as first-shaped polygons each positioned at radially symmetric positions surrounding the first node;

receiving, using the visual user interface, a first input that specifies a selection of a first child node from the one or more child nodes; and in response to receiving the first input, updating the visual user interface to display;

the first node positioned at the center of the visual user interface, the one or more child nodes, other than the first child node, displayed as first-shaped polygons each positioned at radially symmetric positions around a first common circular area surrounding the first node, and one or more first grandchild nodes, which are direct neighbor nodes of the first child node, other than the first node, displayed as second-shaped polygons each positioned at radially symmetric positions around a second common circular area surrounding the one or more child nodes, wherein the first child node is positioned below the first node in the second common circular area surrounding the one or more child nodes.

11. The data processing system of claim 10, wherein the non-transitory computer-readable medium further comprising instructions stored in memory, executed by the one or more processors, cause the performance of:

receiving, in the visual user interface, a second input that specifies a selection of a second child node from the one or more child nodes; and in response to receiving the second input, updating the visual user interface to display;

the first node positioned at the center of the visual user interface, the one or more child nodes, other than the second child node, displayed as first-shaped polygons each positioned at radially symmetric positions around the first common circular area surrounding the first node, wherein the first child node is positioned, within the radially symmetric positions around the first common circular area surrounding the first node at a radially symmetric position other than directly below the first node, and one or more second grandchild nodes, which are direct neighbor nodes of the second child node, other than the first node, displayed as second-shaped polygons each positioned at radially symmetric positions around the second common circular area surrounding the one or more child nodes, wherein the second child node is positioned below the first node in the second common circular area surrounding the one or more child nodes.

12. The data processing system of claim 11, wherein the non-transitory computer-readable medium further comprising instructions stored in memory, executed by the one or more processors, cause the performance of:

receiving, in the visual user interface, a third input that specifies a selection of a second grandchild node from the one or more second grandchild nodes; and in response to receiving the third input, updating the visual user interface to display;

the selected second grandchild node at the center of the visual user interface, one or more great-grandchild nodes, displayed as first-shaped polygons each positioned at radially symmetric positions surrounding the selected second grandchild node, and the second child node positioned at a location, within the visual user interface, that is distinct from the radially symmetric positions surrounding the selected second grandchild node and the center of the visual user interface, wherein the second child node is displayed as a circle with a circular dashed-lined border that delineates an area corresponding to the second child node from areas corresponding to the selected second grandchild node and the radially symmetric positions surrounding the selected second grandchild node.

13. The data processing system of claim 12, wherein the non-transitory computer-readable medium further comprising instructions stored in memory, executed by the one or more processors, cause the performance of:

receiving, in the visual user interface, a fourth input that specifies hovering over a second grandchild node;

in response to receiving the fourth input, displaying a detail icon adjacent to the second grandchild node, which when selected updates the visual user interface to display a summary form of data comprising data stored within the second grandchild node and data associated with the second grandchild node.

14. The data processing system of claim 10, wherein the non-transitory computer-readable medium further comprising instructions stored in memory, executed by the one or more processors, cause the performance of:

displaying, in response to receiving the first input, in association with each of the one or more child nodes displayed as first-shaped polygons, one or more respective text descriptions of the one or more child nodes;

wherein each of the first-shaped polygons are connected to the first node by a solid line; and wherein the first-shaped polygons corresponding to the first child node is connected to the first node by a thick solid line, which is thicker in width than the solid line.

15. The data processing system of claim 14, wherein each of the first-shaped polygons corresponding to the one or more child nodes each contain a visual icon having a distinct form from among a plurality of forms and corresponding to a type of data contained within each corresponding child node.

16. The data processing system of claim 10, wherein updating the visual user interface further comprises:

displaying two or more text descriptions each associated with a first grandchild node of the first grandchild nodes and positioned at a calculated proximity from the associated first grandchild node of the one or more grandchild nodes such that spacing between each text description of the two or more text descriptions is equidistant.

17. The data processing system of claim 10, wherein displaying in the visual user interface further comprises:

displaying a subset of the one or more child nodes as the first-shaped polygons each positioned at radially symmetric positions surrounding the first node when the one or more child nodes, which are direct neighbor nodes of the first node, exceed a configured threshold of displayable nodes;

wherein a number of the child nodes, within the subset of the one or more child nodes, does not exceed the configured threshold;

displaying an icon adjacent to one of the child nodes within the subset of the one or more child nodes; and in response to receiving input selecting the icon, displaying a dropdown list of other child nodes from the one or more child nodes, other than the child nodes within the subset of one or more child nodes.

18. The data processing system of claim 10, wherein updating the visual user interface further comprises:

displaying a subset of the one or more first grandchild nodes as third-shaped polygons each positioned at radially symmetric positions around the second common circular area surrounding the one or more child nodes when the one or more first grandchild nodes, which are direct neighbor nodes of the first child node, other than the first node, exceed a configured threshold of displayable nodes;

wherein a number of grandchild nodes, within the subset of the one or more first grandchild nodes, does not exceed the configured threshold; and displaying page selection icons, positioned below the second common circular area surrounding the one or more child nodes.

\* \* \* \* \*